(12) United States Patent
Jain et al.

(10) Patent No.: US 11,032,162 B2
(45) Date of Patent: Jun. 8, 2021

(54) MOTHOD, NON-TRANSITORY COMPUTER-READABLE STORAGE MEDIUM, AND COMPUTER SYSTEM FOR ENDPOINT TO PERFORM EAST-WEST SERVICE INSERTION IN PUBLIC CLOUD ENVIRONMENTS

(71) Applicant: VMware, Inc., Palo Alto, CA (US)

(72) Inventors: Rahul Jain, Milpitas, CA (US); Mukesh Hira, Los Altos, CA (US); Su Wang, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/515,026

(22) Filed: Jul. 18, 2019

(65) Prior Publication Data
US 2021/0021486 A1   Jan. 21, 2021

(51) Int. Cl.
| | | |
|---|---|---|
| *G06F 15/173* | (2006.01) | |
| *G06F 15/16* | (2006.01) | |
| *H04L 12/24* | (2006.01) | |
| *H04L 12/46* | (2006.01) | |
| *H04L 29/08* | (2006.01) | |

(52) U.S. Cl.
CPC ...... *H04L 41/5041* (2013.01); *H04L 12/4633* (2013.01); *H04L 67/10* (2013.01); *H04L 2212/00* (2013.01)

(58) Field of Classification Search
CPC . H04L 41/5041; H04L 67/10; H04L 12/4633; H04L 2212/00
USPC .......................................... 709/223–224, 249
See application file for complete search history.

(56) References Cited

U.S. PATENT DOCUMENTS

| | | | | |
|---|---|---|---|---|
| 8,830,834 B2* | 9/2014 | Sharma | ............... | H04L 12/4633 370/235 |
| 8,989,192 B2* | 3/2015 | Foo | ..................... | H04L 12/4633 370/392 |
| 9,130,872 B2* | 9/2015 | Kumar | ................ | H04L 41/5041 |
| 9,531,850 B2* | 12/2016 | Nainar | .................... | H04L 45/64 |
| 10,021,196 B1* | 7/2018 | Akers | ..................... | H04L 67/10 |
| 10,148,459 B2* | 12/2018 | Chiu | ................... | H04L 12/4633 |
| 10,333,822 B1 | 6/2019 | Jeuk et al. | | |
| 10,536,563 B2* | 1/2020 | Wang | .................. | H04L 12/4633 |

(Continued)

OTHER PUBLICATIONS

International Search Report and Written Opinion of the International Searching Authority, International application No. PCT/US2019/036812, dated Oct. 9, 2019.

(Continued)

*Primary Examiner* — Bharat Barot
(74) *Attorney, Agent, or Firm* — Su IP Consulting

(57) ABSTRACT

Example methods and computer systems are provided for east-west service insertion in a public cloud environment. An example method may comprise detecting an egress packet that is destined for a second endpoint located in the same virtual network as a first endpoint. The method may also comprise: in response to determination that service insertion is required, identifying a service path based on a service insertion rule; generating an encapsulated packet by encapsulating the egress packet with an outer header that is addressed from the first endpoint to a network device; and sending the encapsulated packet to cause the network device to send the egress packet towards the service path, thereby steering the egress packet towards the service path for processing.

21 Claims, 8 Drawing Sheets

(56) References Cited

U.S. PATENT DOCUMENTS

| | | |
|---|---|---|
| 10,560,345 B2* | 2/2020 | Patel .................. H04L 41/5048 |
| 2010/0254385 A1 | 10/2010 | Sharma et al. |
| 2012/0082048 A1 | 4/2012 | Taft et al. |
| 2013/0163594 A1 | 6/2013 | Sharma et al. |
| 2013/0254762 A1 | 9/2013 | Cochran |
| 2014/0050223 A1 | 2/2014 | Foo et al. |
| 2014/0215010 A1 | 7/2014 | Liang et al. |
| 2016/0087940 A1* | 3/2016 | Miller ................. H04L 12/4633 726/15 |
| 2016/0119226 A1 | 4/2016 | Guichard et al. |
| 2016/0337234 A1 | 11/2016 | Duda et al. |
| 2016/0352538 A1 | 12/2016 | Chiu et al. |
| 2017/0126435 A1 | 5/2017 | Benny et al. |
| 2018/0115519 A1* | 4/2018 | Bonomi ............. H04L 63/1458 |
| 2018/0139073 A1 | 5/2018 | Han et al. |
| 2018/0241809 A1 | 8/2018 | Gandhi et al. |
| 2019/0123962 A1 | 4/2019 | Guo et al. |
| 2019/0245949 A1 | 8/2019 | Wang et al. |
| 2019/0391741 A1 | 12/2019 | Barinov |
| 2019/0392070 A1 | 12/2019 | Johnson et al. |
| 2020/0236046 A1 | 7/2020 | Jain |
| 2020/0236047 A1 | 7/2020 | Hira |

OTHER PUBLICATIONS

International Search Report and Written Opinion of the International Searching Authority, International application No. PCT/US2020/013954, dated Mar. 25, 2020.

* cited by examiner

MOTHOD, NON-TRANSITORY COMPUTER-READABLE STORAGE MEDIUM, AND COMPUTER SYSTEM FOR ENDPOINT TO PERFORM EAST-WEST SERVICE INSERTION IN PUBLIC CLOUD ENVIRONMENTS

BACKGROUND

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, various network-related problems may occur, which adversely affects the performance of hosts and VMs.

In practice, a user (e.g., organization) may run various applications using "on-premise" data center infrastructure in a private cloud environment that is under the user's ownership and control. Alternatively or additionally, the user may run applications "in the cloud" using infrastructure under the ownership and control of a public cloud provider. In the latter case, it may be challenging to provide various services (e.g., firewall) for applications running in a public cloud environment.

DETAILED DESCRIPTION

Figure 1:
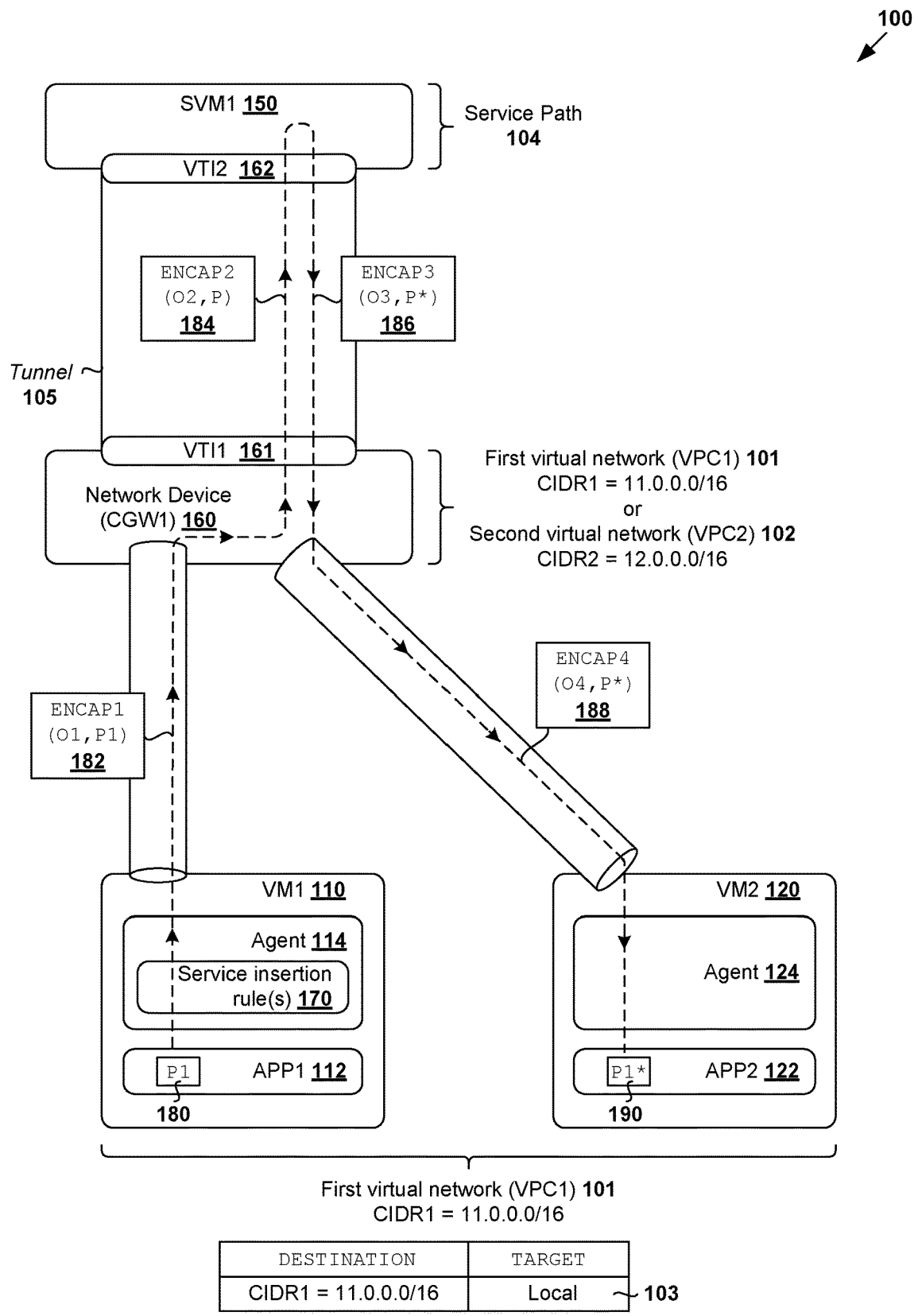
FIG. 1 is a schematic diagram illustrating an example public cloud environment in which east-west service insertion may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to service insertion in public cloud environments will now be explained in more detail using FIG. 1, which is a schematic diagram illustrating example public cloud environment 100 in which east-west service insertion may be performed. It should be understood that, depending on the desired implementation, public cloud environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

In the example in FIG. 1, public cloud environment 100 includes multiple virtual networks 101-102 that are logically isolated from each other. For example, VM1 110 and VM2 120 may be deployed in the same virtual network 101 to run application respective applications (see APP1 112 and APP2" 122) "in the cloud" using a cloud provider's infrastructure. In practice, a "cloud provider" may refer to an entity that offers a cloud-based platform to multiple users or tenants. This way, the tenants may take advantage of the scalability and flexibility provided by public cloud environment 100 to extend the physical capability of their respective on-premise data centers.

Throughout the present disclosure, the term "virtual network" in a public cloud environment may refer generally to a software-implemented network, such as a logical overlay network, that is logically isolated from at least one other virtual network in a public cloud environment. For example, virtual networks 101-102 may be Amazon Virtual Private Clouds (VPCs) provided by Amazon Web Services® (AWS). Amazon VPC and Amazon AWS are registered trademarks of Amazon Technologies, Inc. Using the AWS example in FIG. 1, virtual networks 101-102 are also labelled "VPC1" 101 and "VPC2" 102, respectively. In practice, other types of virtual network may be used, such as Azure Virtual Networks (VNets) from Microsoft Azure®; VPCs from Google Cloud Platform™; VPCs from IBM Cloud™; a combination thereof, etc. In practice, each virtual network 101/102 in public cloud environment 100 may be configured with a classless inter-domain routing (CIDR) block, such as a first CIDR block (i.e., CIDR1=11.0.0.0/16) for VPC1 101, a second CIDR block (i.e., CIDR2=12.0.0.0/16) for VPC2 102, etc. Depending on the desired implementation, each CIDR block (representing a network address block) may be further divided into various subnets, each subnet being a subset of the CIDR block.

Figure 2:
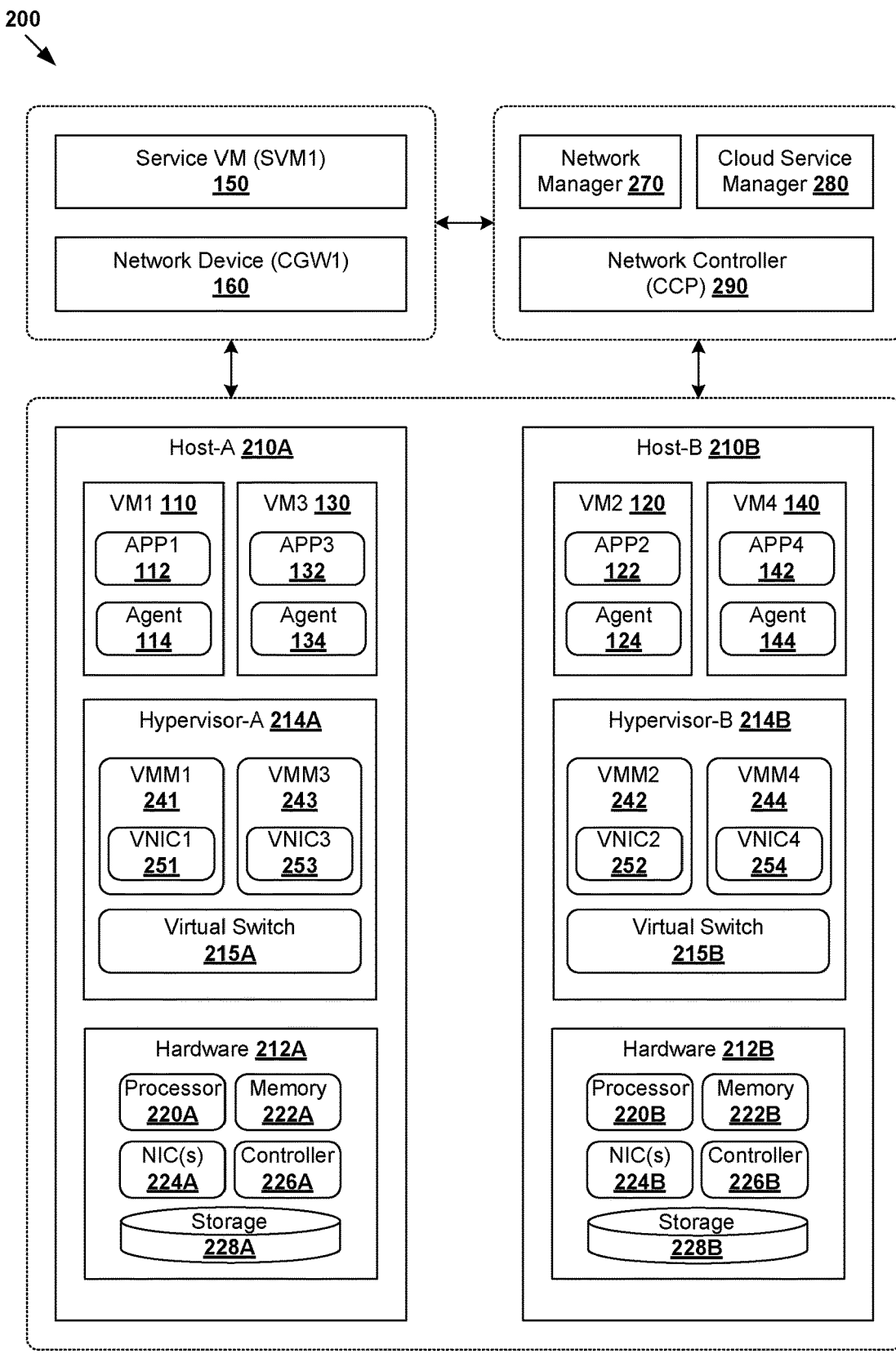
FIG. 2 is a schematic diagram illustrating a physical implementation view of the public cloud environment in FIG. 1.

VMs 110-120 will be explained in more detail using FIG. 2, which is a schematic diagram illustrating physical implementation view 200 of example public cloud environment 100 in FIG. 1. Depending on the desired implementation, physical implementation view 200 may include additional and/or alternative component(s) than that shown in FIG. 2. In the example in FIG. 2, VMs 110-140 may be supported by hosts 210A-B (also known as "end hosts," "computing devices", "host computers", "host devices", "physical servers", "server systems", "physical machines" etc.). For example, VM3 130 and VM4 140 may be deployed in first virtual network 101 (see FIG. 1) to run respective applications "APP3" 132 and "APP4" 142 in the cloud. In practice, it should be understood that VMs 110-140 may be supported by any number of hosts (i.e., not limited to two hosts 210A-B).

Hosts 210A-B may each include virtualization software (e.g., hypervisor 214A/214B) that maintains a mapping between underlying hardware 212A/212B and virtual resources allocated to VMs 110-140. Hosts 210A-B may be interconnected via a physical network formed by various intermediate network devices, such as physical network devices (e.g., physical switches, physical routers, etc.) and/or logical network devices (e.g., logical switches, logical routers, etc.). Hardware 212A/212B includes suitable physical components, such as processor(s) 220A/220B; memory 222A/222B; physical network interface controller(s) or NIC(s) 224A/224B; and storage disk(s) 228A/228B accessible via storage controller(s) 226A/226B, etc.

Virtual resources are allocated to each VM to support a guest operating system (OS) and applications (see 112/122/132/142). Agent 114/124/134/144 may be configured on each VM 110/120/130/140 to perform any suitable processing to support packet handling (e.g., encapsulation and decapsulation), etc. Corresponding to hardware 212A/212B, the virtual resources may include virtual CPU, virtual memory, virtual disk, virtual network interface controller (VNIC), etc. Hardware resources may be emulated using virtual machine monitors (VMMs) 241-244, which may be considered as part of (or alternatively separated from) corresponding VMs 110-140. For example, VNICs 251-254 are virtual network adapters emulated by respective VMMs 241-244.

Although examples of the present disclosure refer to VMs, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 214A/214B further implements virtual switch 215A/215B to handle egress packets from, and ingress packets to, corresponding VMs 110-140. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models. Virtual switches 215A, 215B may be regarded as physical layer-2 switching devices implemented in software at the hypervisor layer. Collectively, a set a virtual switches may implement a logical switch distributed across multiple hosts. The logical switch is a conceptual abstraction that corresponds to the virtual network previously described.

Network manager 270, cloud service manager 280 and network controller 290 are example network management entities that facilitate management of various entities deployed in public cloud environment 100. An example network controller is the NSX controller component of VMware NSX® (available from VMware, Inc.) that resides on a central control plane. Network manager 270 (e.g., NSX manager) and cloud service manager 280 may be entities that reside on a management plane. Cloud service manager 280 may provide an interface for end users to configure their public cloud inventory (e.g., VMs 110-140) in public cloud environment 100. Management entity 270/280/290 may be implemented using physical machine(s), virtual machine(s), a combination thereof, etc.

Referring to FIG. 1 again, service path 104 may be "inserted" between source and destination endpoints (e.g., VMs) to provide various service(s) in public cloud environment 100. In particular, each service path 104 may include at least one (i.e., N≥1) "service virtualized computing instance," which is also known as a "service endpoint," "service VM" (SVM), "virtual network appliance," or "virtual network function" (VNF). For example, SVM1 150 may be "inserted" along a datapath between VM1 110 and VM2 120 to provide a firewall service for security purposes. To achieve this, it is necessary to steer a packet flow between VM1 110 and VM2 120 via SVM1 150, which decides whether to allow or drop packets according to any suitable firewall rules.

Conventionally, there are various challenges associated with east-west service insertion in public cloud environment 100, particularly for endpoints located within the same virtual network. In contrast with a private cloud environment with on-premise infrastructure, a user generally does not have any direct control over underlying hypervisors and hardware that support VMs 110-140. For example, a route table (see 103) is usually configured for VPC1 101. Based on route (destination=CIDR1, target=local), any packet between VM1 110 and VM2 120 (i.e., same CIDR1=11.0.0.0/16) will be treated as local traffic within VPC1 101. Since public cloud providers usually do not allow overriding of a CIDR block route in route table 103, it is challenging to steer traffic (originating in and destined for VPC1 101) to service path 104 that is located outside of VPC1 101.

East-West Service Insertion

According to examples of the present disclosure, east-west service insertion may be implemented for endpoints that are deployed in the same virtual network. For example in FIG. 1, service insertion rule(s) 170 may be configured for VM1 110 to facilitate service insertion along a datapath between VM1 110 and VM2 120 in VPC1 101. Based on service insertion rule(s) 170, VM1 110 (or particularly agent 114) may be configured to encapsulate and steer packets destined for VM2 120 towards SVM1 150 for packet processing.

In the example in FIG. 1, an example network device 160 in the form of a cloud gateway (see "CGW1") is deployed in public cloud environment 100. To facilitate east-west service insertion, tunnel 140 may be established between CGW1 160 and SVM1 150 located on service path 104. This way, according to the service insertion rules, packets may be redirected to SVM1 150 for packet processing via tunnel 140. As used herein, a "network device" may be implemented using one or more virtual machines (VMs) and/or physical machines (also known as "bare metal machines") in public cloud environment 100 and capable of performing functionalities of a gateway, switch, router, bridge, any combination thereof, etc.

As used herein, the term "service path" may refer generally to a path between a source and a destination through which packets are steered to provide service(s) to the packets. A service path may include at least one "service virtualized computing instance" configured to provide a "service." The term "service" may be any suitable networking or non-networking service, such as firewall, load balancing, NAT, intrusion detection system (IDS), intrusion prevention system (IPS), deep packet inspection (DPI), traffic shaping, traffic optimization, packet header enrichment or modification, packet tagging, content filtering, etc. It should be understood that the packet processing operation(s) associated with a service may or may not modify the content (i.e., header and/or payload) of the packets. The term "endpoint" may refer generally an originating node ("first endpoint" or "source endpoint") or terminating node ("second endpoint" or "destination endpoint") of a bi-directional inter-process communication flow.

Figure 3:
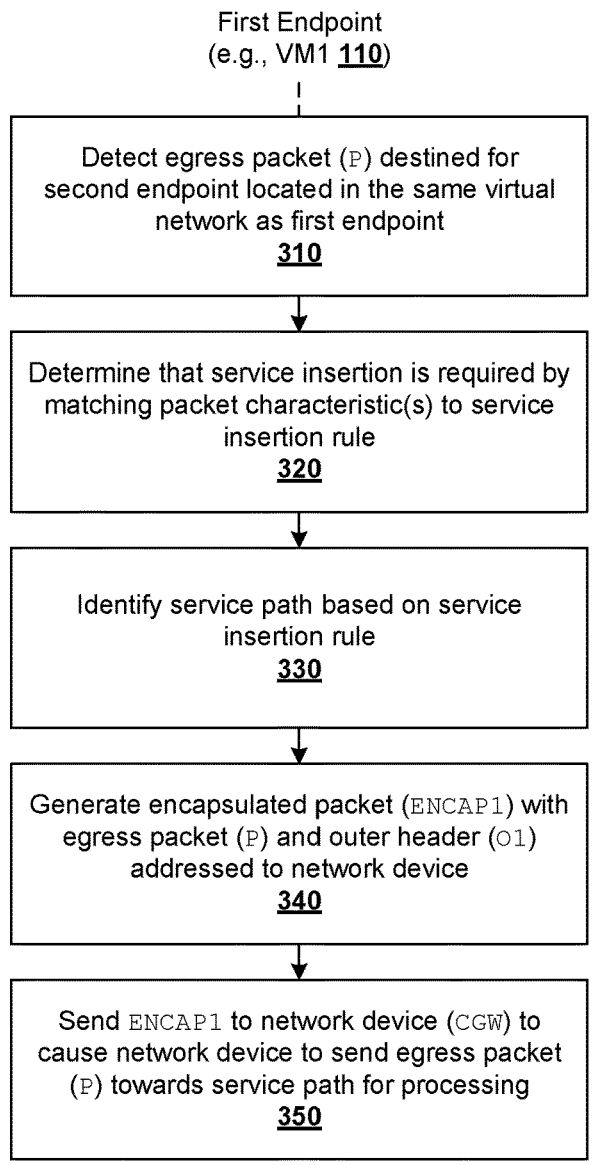
FIG. 3 is a flowchart of an example process for a first endpoint to perform east-west service insertion in a public cloud environment.

In more detail, FIG. 3 is a flowchart of example process 300 for network device 160 to perform east-west service insertion in public cloud environment 100. Example process 300 may include one or more operations, functions, or actions illustrated by one or more blocks, such as 310 to 350. The various blocks may be combined into fewer blocks, divided into additional blocks, and/or eliminated depending on the desired implementation. In the following, various examples will be discussed using VM1 110 as an example "first virtualized computing instance" or "first endpoint," VM2 120 as example "second virtualized computing instance" or "second endpoint," CGW1 160 as example "network device," and SVM1 150 as example "service virtualized computing instance" on service path 104.

At 310 in FIG. 3, first endpoint=VM1 110 (e.g., using agent 114) may detect an egress packet (see "P1" 180 in FIG. 1) that is destined for second endpoint=VM2 120, both being located in VPC1 101. At 320, VM1 110 (e.g., using agent 114) may determine that service insertion is required for egress packet 180 by matching characteristic(s) of egress packet 180 to service insertion rule 170 configured for VM1 110. As used herein, the term "service insertion rule" or "service insertion policy" may refer generally to a rule (e.g., table entry) specifying match field(s) to be matched to characteristic(s) of a packet, and an action that is performed when a match is found. Any suitable characteristic(s) may be matched, such as five-tuple information associated with a packet flow.

At 330, 340 and 350 in FIG. 3, in response to the determination at block 320, VM1 110 (e.g., using agent 114) may identify service path 104, and generate and send an encapsulated packet (see "ENCAP1" 182). For example in FIG. 1, encapsulated packet 182 may be generated by encapsulating egress packet 180 with an outer header (labelled "O1" in FIG. 1) that is addressed from VM1 110 (e.g., IP address=IP-VM1) in VPC1 101 to CGW1 160 (e.g., IP-CGW). This way, encapsulated packet 182 may be sent towards CGW1 160 to cause CGW1 160 to send egress packet 180 towards service path 104 for processing, thereby steering egress packet 180 towards service path 104. In practice, CGW1 160 may be located in the same virtual network (e.g., VPC1 101) as VMs 110-120, or a different virtual network (e.g., VPC2 102 shown in FIG. 1). For example in FIG. 1, VPC2 102 may represent a shared service VPC in which CGW1 160 and SVM1 150 are deployed. SVM1 150 may be deployed in the same virtual network as CGW1 160, or a different virtual network.

In one example (shown in FIGS. 6-7), "ENCAP1" 182 may include context information (labelled "C" in FIG. 1) associated with service path 104 to cause CGW1 160 to, based on the context information, forward egress packet 180 towards service path 104. The context information may identify service path 104 in any suitable manner, such as using a virtual service endpoint IP address (e.g., IP-SVM) associated with SVM1 150. Alternatively (shown in FIG. 8), "ENCAP1" 182 may exclude the context information. In this case, "ENCAP1" 182 may be generated and sent to cause CGW1 160 to forward egress packet 180 towards service path 104 based on characteristic(s) of egress packet 180.

In the example in FIG. 1, in response to receiving "ENCAP1" 182, CGW1 160 may generate and send a second encapsulated packet (labelled "ENCAP2") 182 that includes egress packet 180 to service path 104. After processing by SVM1 150, a processed packet (labelled "P1*") may be sent to CGW1 160 and then to VM2 120. See third and fourth encapsulated packets labelled "ENCAP3" 186 and "ENCAP4" 188, respectively. Note that SVM1 150 may be the only SVM on service path 104 (as shown in FIG. 1 for simplicity), or the first SVM in a service chain on service path 104.

It should be understood that service path 104 may include multiple SVMs (forming a service chain) that includes SVM1 150. In practice, a service chain may represent an instantiation of an ordered set of service functions. Depending on the desired implementation, service path 104 may perform packet modification (i.e., decapsulated packet 172 is different to 174), or not (i.e., 172 same as 174). For example, SVM1 150 implementing a firewall service usually does not modify the header and payload of a packet. In contrast, a NAT service will usually modify address information in a packet, such as by translating a private IP address to a public IP address, etc. Various examples will be discussed below using FIGS. 4-8.

Example Configuration

Figure 4:
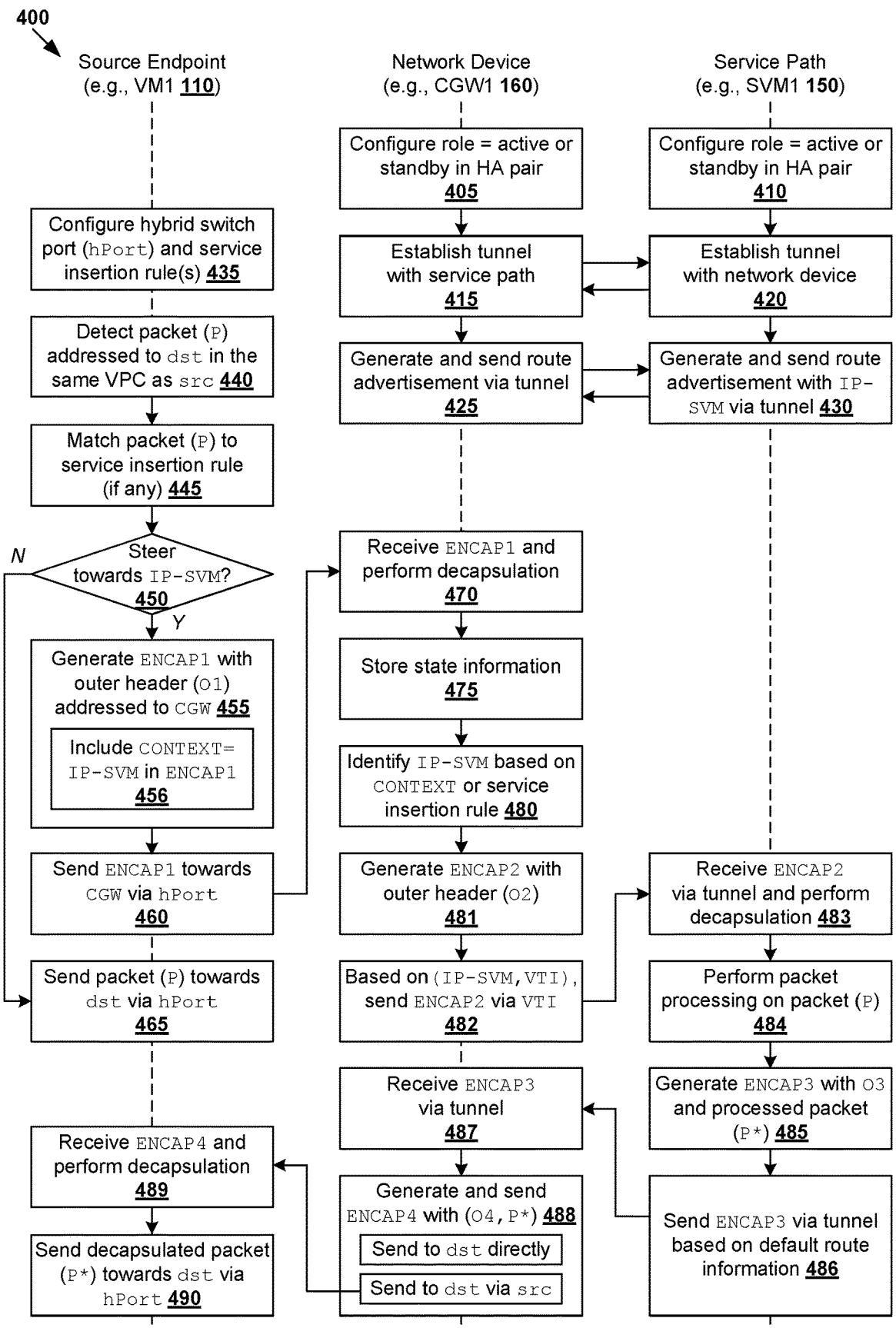
FIG. 4 is a flowchart of an example detailed process for east-west service insertion in a public cloud environment.

FIG. 4 is a flowchart of example detailed process 400 for east-west service insertion in public cloud environment 100. Example process 400 may include one or more operations, functions, or actions illustrated at 405 to 490. The various operations, functions or actions may be combined into fewer blocks, divided into additional blocks, and/or eliminated depending on the desired implementation. The example in FIG. 4 will be explained using FIG. 5, which is a schematic diagram illustrating example logical topology view 500 of public cloud environment 100.

Figure 5:
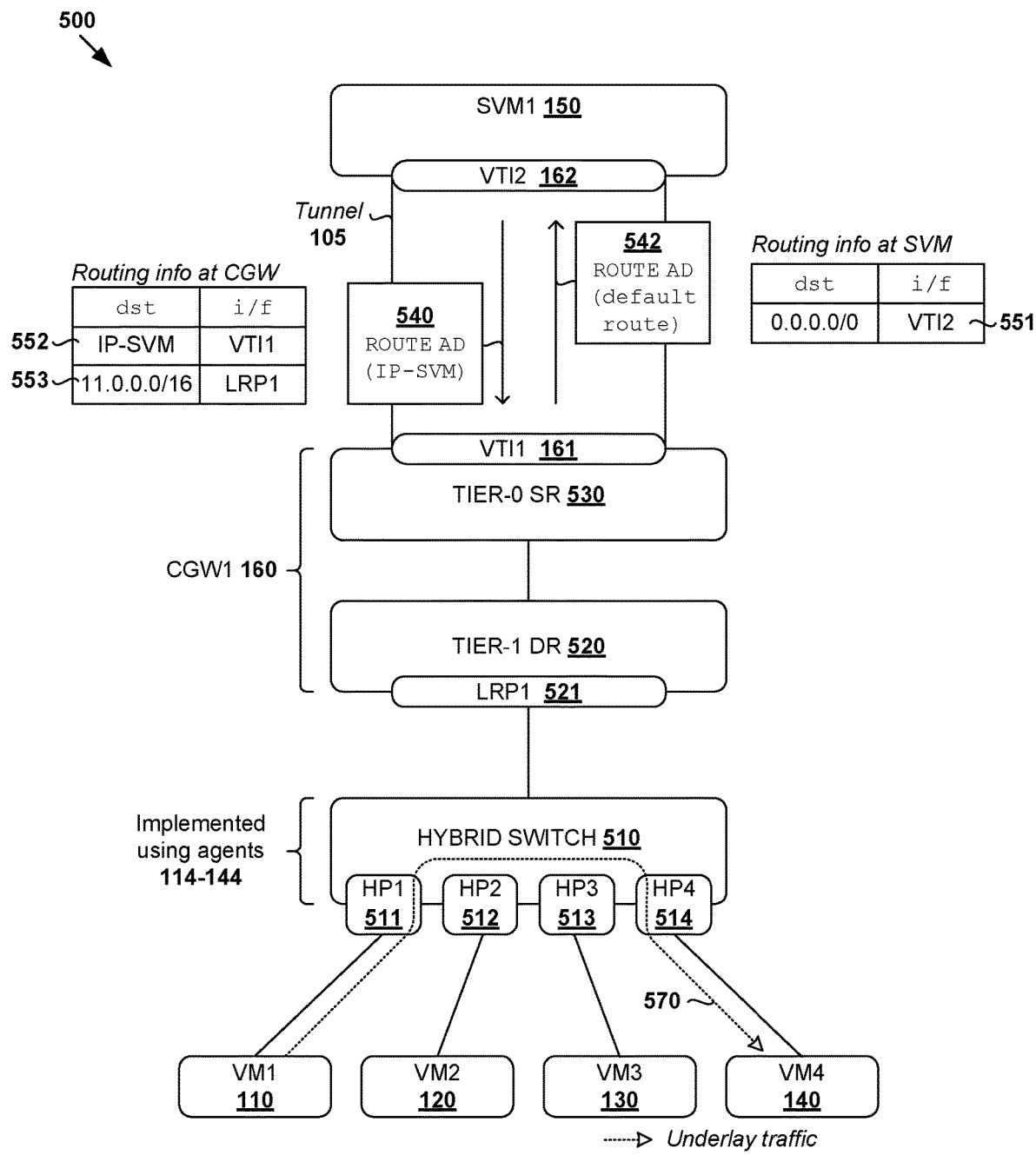
FIG. 5 is a schematic diagram illustrating an example logical topology view of the public cloud environment in FIG. 1.

FIG. 5 represents a logical topology view (also known as a management plane view) of public cloud environment 100 in FIG. 1. Logical topology view 500 shows how VMs 110-140 are connected to SVM1 150 via various logical forwarding elements. For example, VMs 110-140 are connected to hybrid logical switch 510, which is connected to SVM1 150 via TIER-1 distributed router (DR) 520 and TIER-0 service router (SR) 530. In practice, hybrid logical switch 510 may be collectively implemented using agents 114, 124, 134, 144 of respective VMs 110-140. TIER-1 DR 520 and TIER-0 SR 530 may be implemented using CGW1 160. In practice, TIER-1 DR 520 and TIER-0 SR 530 may be connected via any suitable intermediate element(s) that are not shown in FIGS. 1, 5-8 for simplicity, such as logical switch(es), logical router(s), router link port(s), etc.

Using AWS as an example public cloud deployment, VMs 110-140 may be deployed in first virtual network=VPC1 101 associated with CIDR1=11.0.0.0/16. Depending on the desired implementation, multiple subnets may be configured in VPC1 101, each subnet being a subset of CIDR1=11.0.0.0/16. CGW1 160 supports TIER-1 DR 520 and TIER-0 SR 530, which are deployed in second virtual network=VPC2 102 associated CIDR2=12.0.0.0/16 in the example in FIG. 5.

(a) High Availability (HA) Pairs

Referring first to 405-410 in FIG. 4, CGW1 160 and SVM1 150 may be deployed to facilitate east-west service insertion between VMs, such as VM1 110 and VM2 120 in VPC1 101. Depending on the desired implementation, CGW1 160 may be deployed as a member of a high availability (HA) pair of gateways. For example, CGW1 160 may be assigned with role=primary (i.e., active), and CGW2 (not shown) assigned with role=secondary (i.e., standby). Using the active-standby configuration, CGW1 160 usually operates as the active gateway, and CGW2 as the standby gateway. In case of a failure at the active gateway, the standby gateway initiates a switchover or failover process to take over as the active gateway to handle service insertion.

Similarly, SVM1 150 may be deployed as a member of another HA pair. For example, SVM1 150 may be assigned with role=primary (i.e., active), and SVM2 (not shown) with role=secondary (i.e., standby) using an active-standby configuration. When the active SVM fails, the standby SVM may take over as the active SVM. It should be understood that examples of the present disclosure may be implemented for active-active configuration, in which case all members are active at the same time.

To implement the active-standby configuration, each member of the HA pair is configured to detect the aliveness or failure of its peer. For example, a monitoring session may be established between members of the HA pair using any suitable fault detection or continuity check protocol, such as Border Gateway Protocol (BGP), etc. For example, using a monitoring session, members of each HA pair may monitor each other's status (i.e., alive or not) through control messages. HA members may also detect the aliveness by exchanging heartbeat messages.

(b) Tunnel Establishment

At 415 and 420 in FIG. 4, tunnel 105 may be established between CGW1 160 and SVM1 150 to implement a route-based virtual private network (VPN), etc. In the example in FIG. 5, tunnel 105 may be established between a pair of interfaces, such as virtual tunnel interfaces (VTIs) labelled VTI1 161 and VTI2 162 in FIG. 1 and FIG. 5. Any suitable tunneling protocol may be used, such as IPSec for secure communication over tunnel 105. In practice, IPsec describes a framework for providing security services at the network (IP) layer, as well as the suite of protocols for authentication and encryption. One example IPSec protocol is Encapsulating Security Payload (ESP) for data-origin authentication, connectionless data integrity through hash functions, and confidentiality through encryption protection for IP packets. Another example is Authentication Header (AH) for connectionless data integrity and data origin authentication for IP datagrams.

Figure 6:
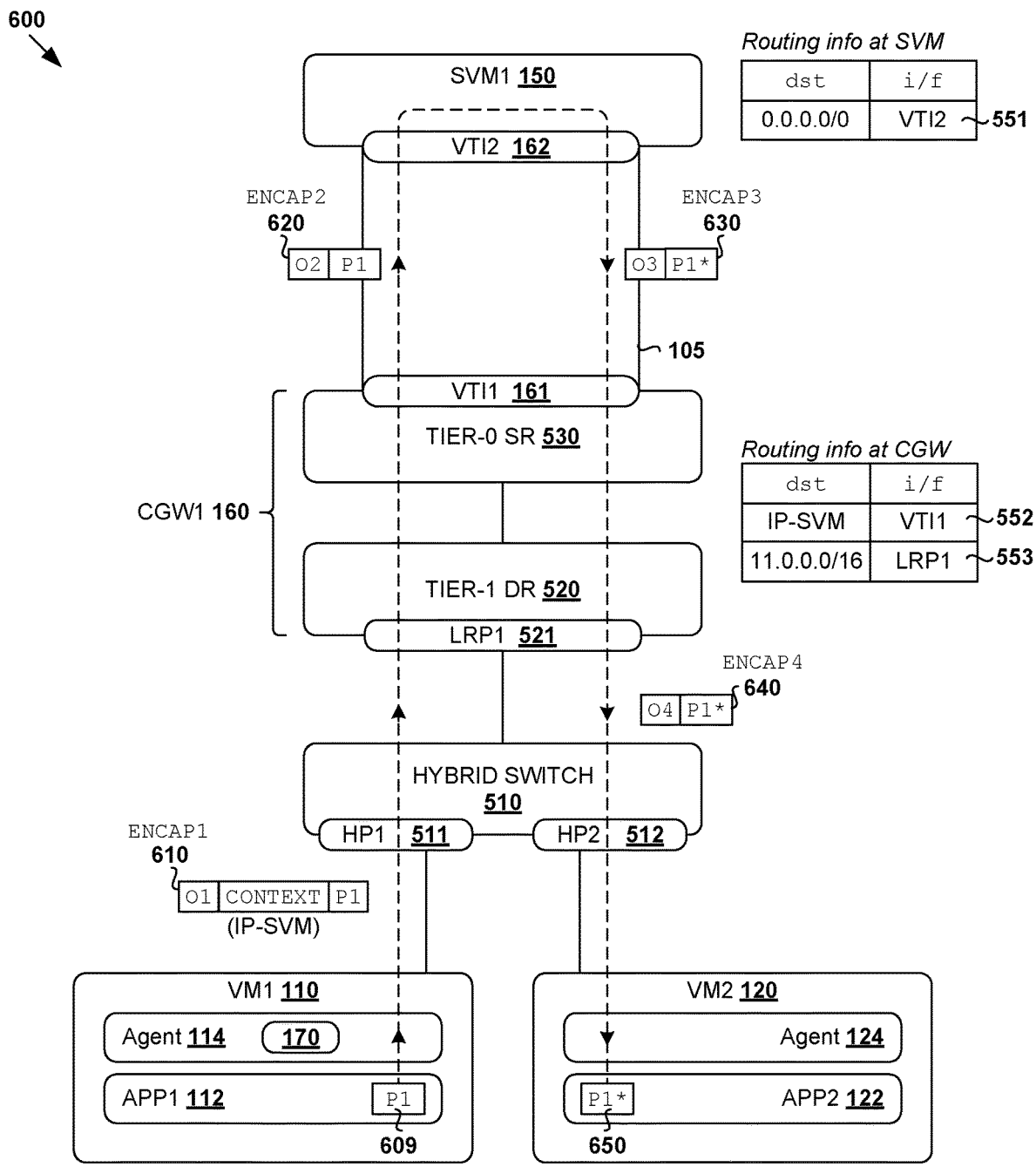
FIG. 6 is a schematic diagram illustrating a first example of east-west service insertion in a public cloud environment according to the example in FIG. 4.

Using IPSec for example, encapsulated packets 640-650 in FIG. 6 may be authenticated (two ways) and encrypted. Users may prefer secure communication between CGW1 160 and SVM1 150 because there might be operational needs for not trusting the underlying cloud infrastructure in public cloud environment 100. In practice, the trust between CGW1 160 and SVM1 150 may be established using any suitable credentials (e.g., passwords, certificates, etc.). Additional tunnels (not shown) may be established between active CGW1 160 and standby SVM2, and between standby CGW2 and active SVM1 150.

(c) Route Information Exchange

At 425 and 430 in FIG. 4, CGW1 160 and SVM1 150 may exchange route information using route advertisements (see 540-542 in FIG. 5) via tunnel 105. In the example in FIG. 5, SVM1 150 may generate and send a first route advertisement (see 540) via tunnel 105 to advertise a virtual network address (e.g., virtual service endpoint IP address IP-SVM) to CGW1 160. In response to receiving first route advertisement 510 via interface VTI1 161, CGW1 160 learns or stores route information in the form of (destination=IP-SVM, interface=VTI1). See 552 in FIG. 5.

Similarly, CGW1 160 may generate and send a second route advertisement (see 542) via tunnel 105 to advertise default route information to SVM1 150. In practice, a "default route" takes effect when no other route is available for an IP destination address according to a longest prefix match approach. For example, the default route is designated as "0.0.0.0/0" in IP version 4 (IPv4), and "::/0" in IP version 6 (IPv6). In response to receiving second route advertisement 520 via interface VT21 142, SVM1 150 updates its route information to store default route (destination=0.0.0.0/0, interface=VTI2). This way, SVM1 150 may be configured to send packets to CGW1 160 after performing packet processing. See 551 in FIG. 5.

Any suitable inter-domain routing protocol (also known as gateway protocol) may be used for route advertisements 540-542, such as such as BGP, Open Shortest Path First (OSPF), Intermediate System to Intermediate System (IS-IS), etc. For example, BGP is an exterior gateway protocol that is used to exchange route information among routers in different autonomous systems.

(d) Hybrid Ports and Service Insertion Rules

At 435 in FIG. 4, a hybrid logical switch port and service insertion rule(s) may be configured for each VM. In the example in FIG. 5, hybrid ports 511-514 are attached to hybrid logical switch 510. "HP1" 511 is configured for VM1 110, "HP2" 512 for VM2 120, "HP3" 513 for VM3 130 and "HP4" 514 for VM4 140. As used herein, a "hybrid logical switch port" or "hybrid port" may refer generally to a logical port of a hybrid logical switch that is configured to handle both underlay traffic (e.g., between VM1 110 and VM2 120 in VPC1 101) and overlay traffic (e.g., between VM1 110 in VPC1 101 and CGW1 160 in VPC 102). For example, a hybrid switch port's default behavior is to leak VPC CIDR block traffic to the underlay, and everything else to the overlay.

Hybrid switch 520 is connected to logical router port 521 (labelled "LRP1") of TIER-1 DR 520. See also routing information 553 that directs traffic destined for 11.0.0.0/16 via LRP1 521. Hybrid switch 520 may be implemented collectively using agents 114-144 of respective VMs 110-140. Hybrid ports 511-514 may be implemented using respective agents 114-144. Using hybrid ports 511-154, a pair of VMs (e.g., VM1 110 and VM2 120) communicating within the same VPC 101 may retain their underlay IP address (usually assigned by the cloud provider). Example hybrid ports are discussed in related U.S. patent application Ser. No. 16/112,599 entitled "Intelligent Use of Peering in Public Cloud," and U.S. patent application Ser. No. 16/112,597 entitled "Transitive Routing in Public Cloud." These patent applications are incorporated herein by reference.

To facilitate east-west service insertion between VMs in the same VPC, service insertion rules may be configured to steer traffic to SVM1 150 located outside of the VPC. In practice, a service insertion rule may be a (e.g., high priority) policy-based rule configured for VPC1 101 with CIDR1=11.0.0.0/16, or a subnet within VPC1 101. Each service insertion rule may specify a set of characteristic(s) to be matched to a packet, and an action to be performed when there is a match. The set may be include five-tuple information of a packet flow, such as source IP address, source port number (PN), destination IP address, destination PN, and protocol. Depending on the desired implementation, a group may be configured to represent a group of IP addresses, port numbers, protocols, etc. Additionally or alternatively, a characteristic may be derived from any suitable meta data associated with the packet.

In the example in FIG. 5, a first rule (see 561) may be configured for traffic between VM1 110 and VM2 120, and a second rule (see 562) for traffic between VM1 110 and VM3 130. First rule 561 specifies characteristics=(source IP address=IP-VM1, destination IP address=IP-VM2, protocol=TCP) and action=(steer to IP-SVM) to steer traffic destined for VM2 120 to SVM1 150 for processing. Similarly, second rule 562 specifies characteristics=(source IP address=IP-VM1, destination IP address=IP-VM3, protocol=HTTP) and action=(steer to IP-SVM) to steer traffic destined for VM3 130 to SVM1 150. Note that no service insertion rule is defined for the traffic between VM1 110 and VM4 140, which means that they can communicate directly in the underlay. For example, underlay traffic (see 570) may be forwarded from VM1 110 to VM4 134 via hybrid switch 510.

East-West Service Insertion

FIG. 6 is a schematic diagram illustrating first example 600 of east-west service insertion in public cloud environment 100 according to the example in FIG. 4. In the example in FIG. 6, consider a scenario where VM1 110 generates and sends an egress packet (labelled "P1" 609) with data originating from application (APP1) 112. Egress packet 609 includes a header specifying (source IP-VM1, destination IP-VM2), where both VM1 110 and VM2 120 are in VPC1 101. In this case, agent 114 on VM1 110 may apply service insertion rule 170/561 to steer egress packet 609 towards SVM1 150 to facilitate east-west service insertion.

(a) Processing by Source Endpoint

Referring to FIG. 4 again, at 440, 445 and 450, in response to detecting egress packet 609 that includes data originating from application (APP1) 112, agent 114 may determine that steering of egress packet 609 to SVM1 150 is required. In practice, this may involve matching (source IP-VM1, destination IP-VM2, protocol=TCP) in egress packet 609 to first service insertion rule 561. Based on action=steer to IP-SVM, it is determined that service insertion is required.

At 455 and 460 in FIG. 4, agent 114 may generate and send an encapsulated packet 610 (labelled "ENCAP1") by encapsulating "P1" 609 with an outer header (labelled "O1"). The outer header is addressed from IP-VM1 to IP-CGW associated with CGW1 160. Any suitable tunneling protocol may be used between CGW1 160 and VM1 110, such as Generic Network Virtualization Encapsulation (GENEVE), etc.

According to examples of the present disclosure, any suitable approach may be used to cause CGW1 160 to steer "ENCAP1" 610 to SVM1 150. In the example in FIG. 6, one approach involves agent 114 adding context information (labelled "CONTEXT") specifying IP address=IP-SVM associated with SVM1 150 in the encapsulation header (e.g., GENEVE header option). See block 456. Alternatively (to be discussed using FIG. 8), no context information is added but additional service insertion rule(s) are configured at CGW1 160. In both cases, "ENCAP1" 610 may be sent via hybrid port=HP1 511 towards TIER-1 DR 520 and TIER-0 SR 530.

As discussed using FIG. 5, not all traffic originating from VM1 110 and destined for the same VPC1 101 requires service insertion. For example, VM1 110 may send egress packets (i.e., underlay traffic 570 in FIG. 5) to VM4 140 directly without steering them towards SVM1 150. In this case, according to block 465, egress packets may be sent to VM4 140 via source HP1 511, hybrid logical switch 510 and destination HP4 514. As described using FIG. 5, hybrid ports (e.g., HP1 511) may be configured to retain any underlay IP addresses assigned to VM1 110 and VM4 140.

(b) Processing by Cloud Gateway

At 470 and 475 in FIG. 4, in response to receiving "ENCAP1" 610 from VM1 110, CGW1 160 performs decapsulation to remove the outer header. At 436 in FIG. 4, CGW1 160 may also store state information associated with the packet flow to handle processed packets from active SVM1 150 (to be explained further below). Any suitable state information may be stored, such as five-tuple information (source IP address=IP-VM1, destination IP address=IP-VM2, source port number, destination port number, protocol), packet sequence number, packet meta data, etc. The state information may be used to ensure that CGW1 160 does not steer the same packet to SVM1 150 twice (i.e., once when a packet is received from VM1 110, and another when the packet is received from SVM1 150 after processing).

Further, at 480-482, CGW1 160 performs route lookup to identify SVM1 150, and generates and sends second encapsulated packet 620 (labelled "ENCAP2") that includes inner packet (P1) and second outer header (O2). Outer header (O2) may be a tunnel header addressed from source tunnel IP address=IP-CGW to destination tunnel IP address=IP-Y, which is a routable IP address of SVM1 150 having virtual service endpoint IP address=IP-SVM. Using IPSec for example, encapsulated packet 620 may be padded with encryption-related data (not shown for simplicity), such as ESP trailer data and ESP authentication data before being sent over tunnel 105. "ENCAP2" 620 may be sent over tunnel 105 via tunnel interface VTI1 161 based on route information (destination=IP-SVM, interface=VTI1). See 552 in FIG. 5.

(c) Processing by Service Path

At 483-484 in FIG. 4, in response to receiving "ENCAP2" 620 via tunnel 105, SVM1 150 removes outer header (O2) and performs packet processing on inner packet (P1). Using a firewall service as an example, SVM1 150 may determine whether to allow or drop the inner packet (P1) based on a firewall rule. In another example, SVM1 150 may perform NAT for packets to and from external network 105, such as by translating a private IP address (e.g., source IP-VM1) associated with VM1 110 to a public IP address.

At 485-486 in FIG. 4, after packet processing (e.g., inner packet is not dropped), SVM1 150 generates and sends third encapsulated packet 630 (labelled "ENCAP3") that includes processed inner packet (P1*) and a third outer header (O3) addressed from IP-Y to IP-CGW. SVM1 150 forwards "ENCAP3" 630 towards CGW1 160 via VTI2 162 according to the default route information. See 551 in FIG. 5.

(d) Forwarding Towards Destination (Directly)

At 487-488 in FIG. 4, in response to receiving "ENCAP3" 630 from SVM1 150 via tunnel 105, CGW1 160 generates and sends fourth encapsulated packet 640 (labelled "ENCAP4") towards destination VM2 120. "ENCAP4" 640 may be sent towards VM2 120 directly, or via source VM1 110. The state information stored at block 475 may be used to ensure that the same packet is not sent to, and processed by, SVM1 150 twice.

In the example in FIG. 6, "ENCAP4" 640 is sent to VM2 120 via TIER-1 DR 520, hybrid logical switch 510 and hybrid port HP2 512. In this case, "ENCAP4" 640 includes a processed inner packet (P1*) and a fourth outer header (O4) that is addressed from IP-CGW to IP-VM2. At VM2 120, agent 124 may perform decapsulation and send the processed packet (P*) towards APP2 112, thereby completing an end-to-end packet forwarding process with east-west service insertion.

(e) Forwarding Towards Destination (Via Source)

Figure 7:
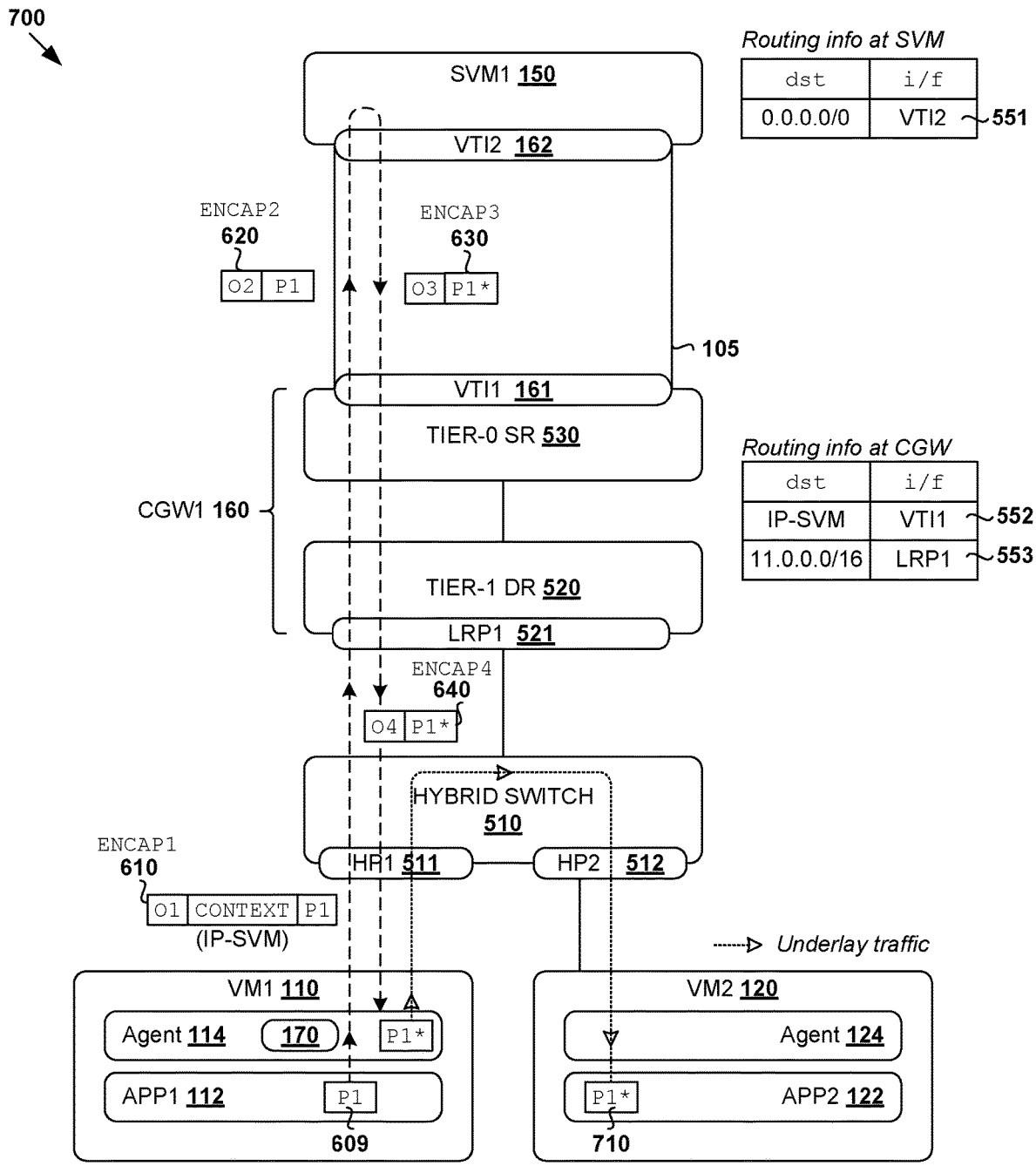
FIG. 7 is a schematic diagram illustrating a second example of east-west service insertion in a public cloud environment according to the example in FIG. 4.

Alternatively, "ENCAP4" 640 may be first sent to VM1 110 to cause VM1 110 to forward the processed packet to VM2 120. An example is shown in FIG. 7, which is a schematic diagram illustrating second example 700 of east-west service insertion in public cloud environment 100 according to the example in FIG. 4. In this case, "ENCAP4" 640 includes processed inner packet (P1*) 660, and a fourth outer header (O4) addressed from IP-CGW to IP-VM1. "ENCAP4" 640 is sent to VM1 110 via TIER-1 DR 520, hybrid logical switch 510 and HP1 511.

According to 489-490 in FIG. 4, in response to receiving "ENCAP4" 640, agent 114 may perform decapsulation and send processed packet 710 (P*) towards VM2 120 via hybrid logical switch 510. Some users may prefer this approach to obtain more underlay visibility on the packet flow between VM1 110 and VM2 120. Once received by VM2 120 via HP2 512, processed packet (P*) 710 is forwarded to APP2 122, thereby completing the end-to-end packet forwarding process with east-west service insertion.

It should be understood that example process 400 in FIG. 4 may be performed for the reverse traffic from VM2 120 to VM1 110. In this case, VM2 120 may perform the role of a "first endpoint," and VM1 110 as a "second endpoint." Using an agent-based approach, agent 124 may implement the example in FIG. 4 to facilitate east-west service insertion. Various details explained using FIG. 4 are applicable to the return traffic and will not be repeated here for brevity.

Variations

Figure 8:
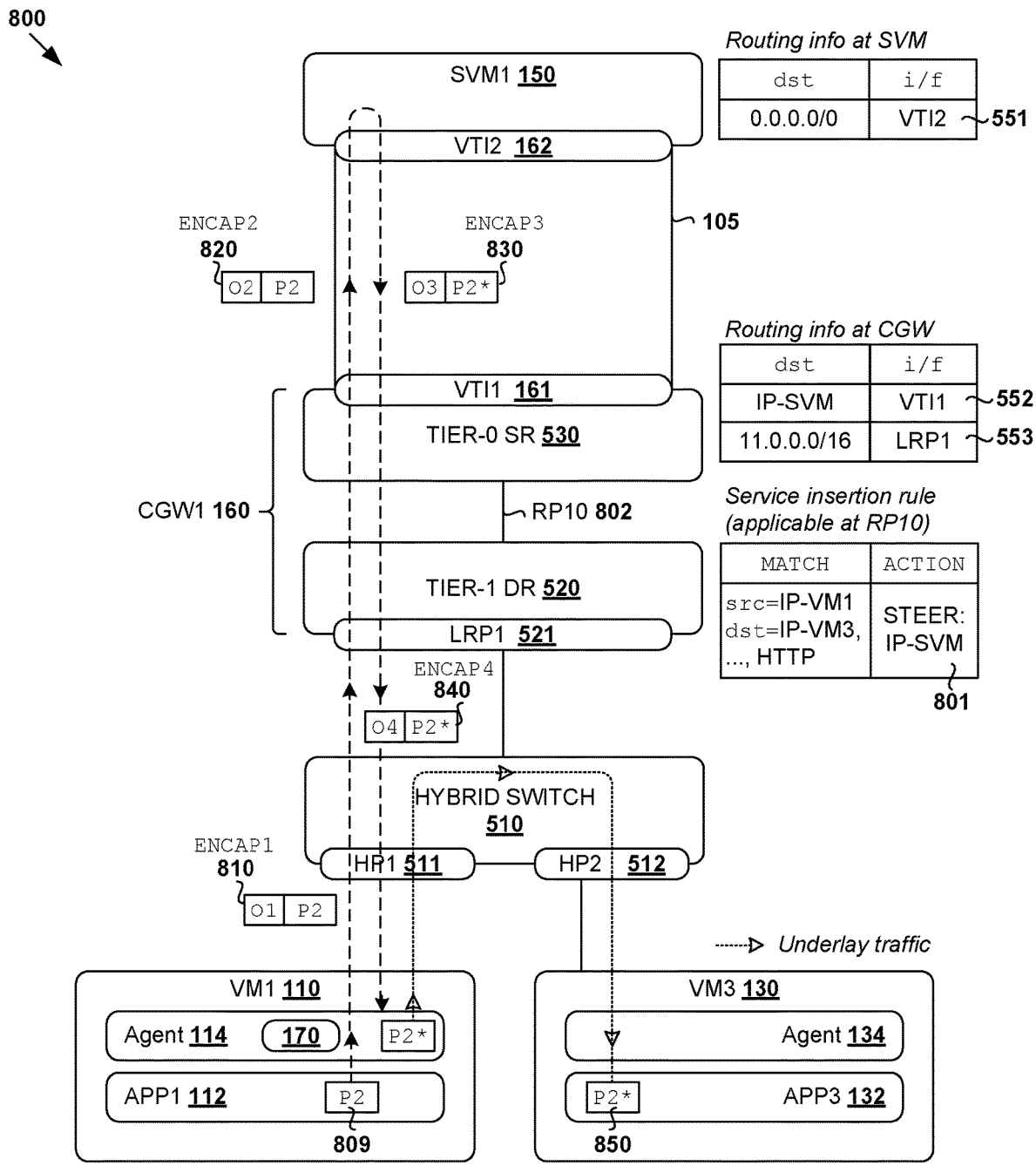
FIG. 8 is a schematic diagram illustrating a third example of east-west service insertion in a public cloud environment according to the example in FIG. 4.

Another example is shown in FIG. 8, which is a schematic diagram illustrating third example 800 of east-west service insertion in public cloud environment 100 according to the example in FIG. 4. In the example in FIG. 8, consider a scenario where east-west service insertion is required for a packet flow between VM1 110 and VM3 130 located in VPC1 101. Similar to the example in FIG. 6, egress packet (P2) 809 may be steered towards CGW1 160 and SVM1 150 by applying service insertion rule 170/562. See also encapsulated packets labelled "ENCAP1" 810 from VM1 110 to CGW1 160; "ENCAP2" 820 from CGW1 160 to SVM1 150; "ENCAP3" 830 from SVM1 150 to CGW1 160; and "from CGW1 160 to VM1 110.

In contrast with the example in FIGS. 6-7, however, no context information is include in "ENCAP1" 810 from VM1 110 to CGW1 160. To facilitate east-west service insertion, a service insertion rule (see 801) specifying characteristics of a packet flow between VM1 110 and VM3 130 may be configured. This way, based on characteristics (source IP-VM1, destination IP-VM3, protocol=HTTP) in egress packet (P2) 809, CGW1 160 may apply service insertion rule 801 to steer packets towards SVM1 150 for processing. Service insertion rule 801 may be a policy-based rule that is applicable on a backplane interface (e.g., LRP1 521) of TIER-1 DR 520 that connects with hybrid switch 510. Depending on the desired implementation, service insertion rule 801 may be applied at a router link port (e.g., "RP10" 802 in FIG. 8) that connects TIER-0 SR 530 and TIER-1 DR 520. As explained above, TIER-0 SR 530 and TIER-1 DR 520 may be connected using any suitable intermediate logical elements that are not shown in FIG. 8 for simplicity.

On the return path, processed packet (P2*) 850 may be sent to VM1 110 in an encapsulated form (see ENCAP4" 840) before being forwarded to VM3 130 via HP1 511, hybrid logical switch 510 and HP2 512. Processed packet (P*) 850 is then forwarded to APP3 132, thereby completing the end-to-end packet forwarding process with east-west service insertion for VM3 130 via VM1 110.

Although examples of the present disclosure have been explained using tunnel 105, CGW1 160 and SVM1 150 may communicate natively (i.e., without any tunnel and encapsulation) in some scenarios. For example, a non-tunneling approach may be implemented by deploying both source endpoint (e.g., VM1 110) and destination endpoint (e.g., VM2 120 or VM3 130) in VPC1 101, while CGW1 160 and SVM1 150 are deployed in VPC2 102 (i.e., different VPC). This way, from the perspective of CGW1 160, CGW1 160 may forward/receive packets in decapsulated form (i.e., natively) to/from SVM1 150. From the perspective of SVM1 150, SVM1 150 may forward/receive decapsulated packets in decapsulated form to/from CGW1 160. In this case, IPSec tunnels are not used between CGW1 160 and SVM1 150, which means it is not necessary to perform encryption and decryption operations, which may be resource-intensive.

Container Implementation

Although explained using VMs 110-140, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 110-140. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, the instructions or program code, when executed by the processor of the computer system, may cause the processor to implement an "endpoint" to perform east-west service insertion according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs) and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first endpoint to perform east-west service insertion in a public cloud environment that includes a first virtual network and a second virtual network, wherein the method comprises:
   detecting an egress packet that is destined for a second endpoint, wherein both the first endpoint and the second endpoint are located in the first virtual network; and
   in response to determination that service insertion is required for the egress packet by matching one or more characteristics of the egress packet to a service insertion rule configured for the first endpoint,
   based on the service insertion rule, identifying a service path that is configured to process the egress packet according to one or more services;
   generating an encapsulated packet by encapsulating the egress packet with an outer header that is addressed from the first endpoint to a network device, wherein the network device is located in the first virtual network or the second virtual network, and connects the first endpoint with the service path; and
   sending the encapsulated packet to cause the network device to send the egress packet towards the service path, thereby steering the egress packet towards the service path for processing.

2. The method of claim 1, wherein generating the encapsulated packet comprises:
   generating the encapsulated packet to include context information associated with the service path to cause the network device to, based on the context information, forward the egress packet towards the service path.

3. The method of claim 2, wherein generating the encapsulated packet comprises:
   configuring the context information to specify a virtual network address associated with a service virtualized computing instance located on the service path.

4. The method of claim 1, wherein generating the encapsulated packet comprises:
   generating the encapsulated packet to include the egress packet to cause the network device to, based on the one or more characteristics of the egress packet, forward the egress packet towards the service path.

5. The method of claim 1, wherein sending the encapsulated packet towards the network device comprises:
   sending the encapsulated packet to a cloud gateway, being the network device, via a first hybrid switch port configured for the first endpoint.

6. The method of claim 5, wherein the method further comprises:
   detecting, from the service path via the cloud gateway, a further encapsulated packet that includes a processed packet, being the egress packet after processing by the service path; and
   forwarding the processed packet towards the second endpoint via the first hybrid switch port configured for the first endpoint.

7. The method of claim 1, wherein the determination that east-west service insertion is required comprises:
   matching one or more characteristics of the following characteristics of the egress packet to the service insertion rule: a source address associated with the first endpoint, a destination address associated with the second endpoint, a source port number, a destination port number and a protocol.

8. A non-transitory computer-readable storage medium that includes a set of instructions which, in response to execution by a processor of a computer system, cause the processor to support a first endpoint to perform a method of east-west service insertion in a public cloud environment, wherein the method comprises:
   detecting an egress packet that is destined for a second endpoint, wherein both the first endpoint and the second endpoint are located in the first virtual network; and
   in response to determination that service insertion is required for the egress packet by matching one or more characteristics of the egress packet to a service insertion rule configured for the first endpoint, based on the service insertion rule, identifying a service path that is configured to process the egress packet according to one or more services;

generating an encapsulated packet by encapsulating the egress packet with an outer header that is addressed from the first endpoint to a network device, wherein the network device is located in the first virtual network or the second virtual network and connects the first endpoint with the service path; and sending the encapsulated packet to cause the network device to send the egress packet towards the service path for processing, thereby steering the egress packet towards the service path.

9. The non-transitory computer-readable storage medium of claim 8, wherein generating the encapsulated packet comprises:

generating the encapsulated packet to include context information associated with the service path to cause the network device to, based on the context information, forward the egress packet towards the service path.

10. The non-transitory computer-readable storage medium of claim 9, wherein generating the encapsulated packet comprises:

configuring the context information to specify a virtual network address associated with a service virtualized computing instance located on the service path.

11. The non-transitory computer-readable storage medium of claim 8, wherein generating the encapsulated packet comprises:

generating the encapsulated packet to include the egress packet to cause the network device to, based on the one or more characteristics of the egress packet, forward the egress packet towards the service path.

12. The non-transitory computer-readable storage medium of claim 8, wherein sending the encapsulated packet towards the network device comprises:

sending the encapsulated packet to a cloud gateway, being the network device, via a first hybrid switch port configured for the first endpoint.

13. The non-transitory computer-readable storage medium of claim 12, wherein the method further comprises:

detecting, from the service path via the cloud gateway, a further encapsulated packet that includes a processed packet, being the egress packet after processing by the service path; and forwarding the processed packet towards the second endpoint via the first hybrid switch port configured for the first endpoint.

14. The non-transitory computer-readable storage medium of claim 8, wherein determination that east-west service insertion is required comprises:

matching one or more characteristics of the following characteristics of the egress packet to the service insertion rule: a source address associated with the first endpoint, a destination address associated with the second endpoint, a source port number, a destination port number and a protocol.

15. A computer system for east-west service insertion in a public cloud environment, wherein the computer system comprises:

a processor; and a non-transitory computer-readable medium having stored thereon instructions that, when executed by the processor, cause the processor to support a first endpoint to perform the following:

detect an egress packet that is destined for a second endpoint, wherein both the first endpoint and the second endpoint are located in a first virtual network; and in response to determination that service insertion is required for the egress packet by matching one or more characteristics of the egress packet to a service insertion rule configured for the first endpoint, based on the service insertion rule, identify a service path that is configured to process the egress packet according to one or more services;

generate an encapsulated packet by encapsulating the egress packet with an outer header that is addressed from the first endpoint to a network device, wherein the network device is located in first virtual network or a second virtual network and connects the first endpoint with the service path; and send the encapsulated packet to cause the network device to send the egress packet towards the service path, thereby steering the egress packet towards the service path for processing.

16. The computer system of claim 15, wherein the instructions for generating the encapsulated packet cause the processor to:

generate the encapsulated packet to include context information associated with the service path to cause the network device to, based on the context information, forward the egress packet towards the service path.

17. The computer system of claim 16, wherein the instructions for generating the encapsulated packet cause the processor to:

configure the context information to specify a virtual network address associated with a service virtualized computing instance located on the service path.

18. The computer system of claim 15, wherein the instructions for generating the encapsulated packet cause the processor to:

generate the encapsulated packet to include the egress packet to cause the network device to, based on the one or more characteristics of the egress packet, forward the egress packet towards the service path.

19. The computer system of claim 15, wherein the instructions for sending the encapsulated packet towards the network device cause the processor to:

send the encapsulated packet to a cloud gateway, being the network device, via a first hybrid switch port configured for the first endpoint.

20. The computer system of claim 19, wherein the instructions further cause the processor to:

detect, from the service path via the cloud gateway, a further encapsulated packet that includes a processed packet, being the egress packet after processing by the service path; and forward the processed packet towards the second endpoint via the first hybrid switch port configured for the first endpoint.

21. The computer system of claim 15, wherein the instructions for determining that east-west service insertion is required cause the processor to:

match one or more characteristics of the following characteristics of the egress packet to the service insertion rule: a source address associated with the first endpoint, a destination address associated with the second endpoint, a source port number, a destination port number and a protocol.

* * * * *